United States Patent
Chiang et al.

(10) Patent No.: US 8,045,039 B2
(45) Date of Patent: Oct. 25, 2011

(54) METHOD OF LUMINANCE COMPENSATION FOR A CAMERA LENS USING MULTILINE INTERPOLATION

(75) Inventors: Cheng-Huei Chiang, Longjing Township, Taichung County (TW); Shu-Ching Hsieh, Longtan Township, Taoyuan County (TW)

(73) Assignee: Service & Quality Technology Co., Ltd., Taipei (TW)

( * ) Notice: Subject to any disclaimer, the term of this patent is extended or adjusted under 35 U.S.C. 154(b) by 316 days.

(21) Appl. No.: 12/458,038

(22) Filed: Jun. 30, 2009

(65) Prior Publication Data

US 2010/0328523 A1    Dec. 30, 2010

(51) Int. Cl.
*H04N 5/225*    (2006.01)
*G06K 9/32*    (2006.01)
(52) U.S. Cl. .................... 348/335; 348/336; 382/300
(58) Field of Classification Search .......... 348/335–344, 348/538; 382/300; 358/428, 525
See application file for complete search history.

(56) References Cited

U.S. PATENT DOCUMENTS

| | | | |
|---|---|---|---|
| 6,782,143 B1 * | 8/2004 | Dube et al. | 382/300 |
| 7,088,388 B2 * | 8/2006 | MacLean et al. | 348/234 |
| 7,834,925 B2 * | 11/2010 | Kim | 348/335 |

* cited by examiner

*Primary Examiner* — Sinh Tran
*Assistant Examiner* — Selam Gebriel
(74) *Attorney, Agent, or Firm* — Rosenberg, Klein & Lee

(57) ABSTRACT

Provided is a method of luminance compensation for a camera lens by performing a multiline interpolation algorithm. Preferably, a plurality of directional lines are radially arranged on a curved surface of the lens. Sampling dots are then designated along the directional lines in equal or variant distances. Steps including a step of determining the location of a target for luminance compensation, a step of obtaining adjacent directional lines by referring to a slope at the target, a step of calculating the correction values and the weights for interpolation are further introduced. The interpolation algorithm is used to restore a correction plane of a whole image. A polynomial equation is preferably used to obtain two correction values of two directional lines with the same radius. Alternatively, a lookup table is introduced to find the two correction values. It's featured that a symmetric or asymmetric compensation for the camera lens is achieved.

13 Claims, 4 Drawing Sheets

METHOD OF LUMINANCE COMPENSATION FOR A CAMERA LENS USING MULTILINE INTERPOLATION

BACKGROUND OF THE INVENTION

1. Field of the Invention

The present invention relates to a method of luminance compensation for a camera lens using Multiline Interpolation, and more particularly, to restore an image's plane by a correction value calculated from the sampling dots along the virtual directional lines arranged on the lens' surface.

2. Description of Related Art

The camera lens is one of the most important factors that dominate the quality of photographs. During the process of manufacturing the camera, lower quality lenses may be used in the product under consideration of cost. The low-cost camera lens may cause uneven formation of image as the light passes through the lens. Meanwhile, the image would be unharmonious since the luminance near the lens border is less than the central region. However, a proper calibration can improve the lens' luminance effectively.

Currently, the conventional ways of luminance compensation for the camera lens can roughly be separated into two categories, which are symmetric compensation and asymmetric compensation for the camera lens. The symmetric compensation for the camera lens is usually used for high-quality camera lenses, in which the distribution of luminance on the image's plane presents a simple variation of cosine θ. That is, the high-quality camera lens usually has higher luminance at off-axis than the luminance around the central axis. Moreover, the ranges of reduction relative to the lens center are uniform in every direction. The variations of the luminance contour lines are shown as the simple geometric changes, such as a right circle, an ellipse, or a dual-curved line. By the corresponding geometric equation, the mentioned luminance reduction for the high-quality lens is comparatively simple to be compensated.

Asymmetric lenses are often used for low-cost products. The design therefor has defects which cause the lens' luminance plane to have abnormal changes. Although the lens center of the most low-cost lenses can keep lighter than the distribution at the border, the luminance variations in every direction on the surface have no uniform distribution. Meanwhile the luminance contour lines on the lens surface can not use the simple geometric pattern or equation to describe the image's plane. More sampling dots are necessary for restoring the whole correction plane. After that, the image's plane can be evenly compensated.

SUMMARY OF THE INVENTION

One of the objects of the present invention is to provide a method of luminance compensation for a camera lens by performing a multiline interpolation algorithm. Therein, symmetric or asymmetric luminance compensation is introduced to compensate the camera lens. A plurality of virtual and radial directional lines are preferably arranged on the curved surface of the lens. Next, a plurality of luminance sampling dots are designated on each directional line at the same or different distances from the lense centre. In a preferred embodiment, an interpolation weight is designated based on the location of the square of the distance between the pixel to be corrected and the lens center, or the sinusoidal variance of the vertical or horizontal axis through the lens center.

A luminance interpolation value for the two adjacent sampling directional lines at the same distance from the lense centre is further incorporated. Therefore the whole image's correction plane can be restored by performing an interpolation algorithm of the luminance correction for compensating the luminance of a specific target. The region of the camera lens with non-uniform luminance variations can be corrected consequently. Further, the embodiment can be adapted to low-cost and low-quality lens since the claimed interpolation algorithm is simple and easy to design.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

In order to solve the non-uniform luminance variations occurring along the radial direction from the center to the border of an asymmetric lens, the present invention provides a method of luminance compensation for a lens by performing a multiline interpolation algorithm. The method of multiline interpolation is to increase regional sampling dots to be the reference to perform a regional compensation. Furthermore, a plurality of directional lines are radially arranged from a lens center to the lens border, and those directional lines are the positions designated for the sampling dots. A lookup table (LUT) is then established to store the luminance variations of the sampling dots. Alternatively, a polynomial approximation can also be a way to record the luminance variations. During the correction, the data recorded in the lookup table can be a basis for interpolation restoration.

Figure 1:
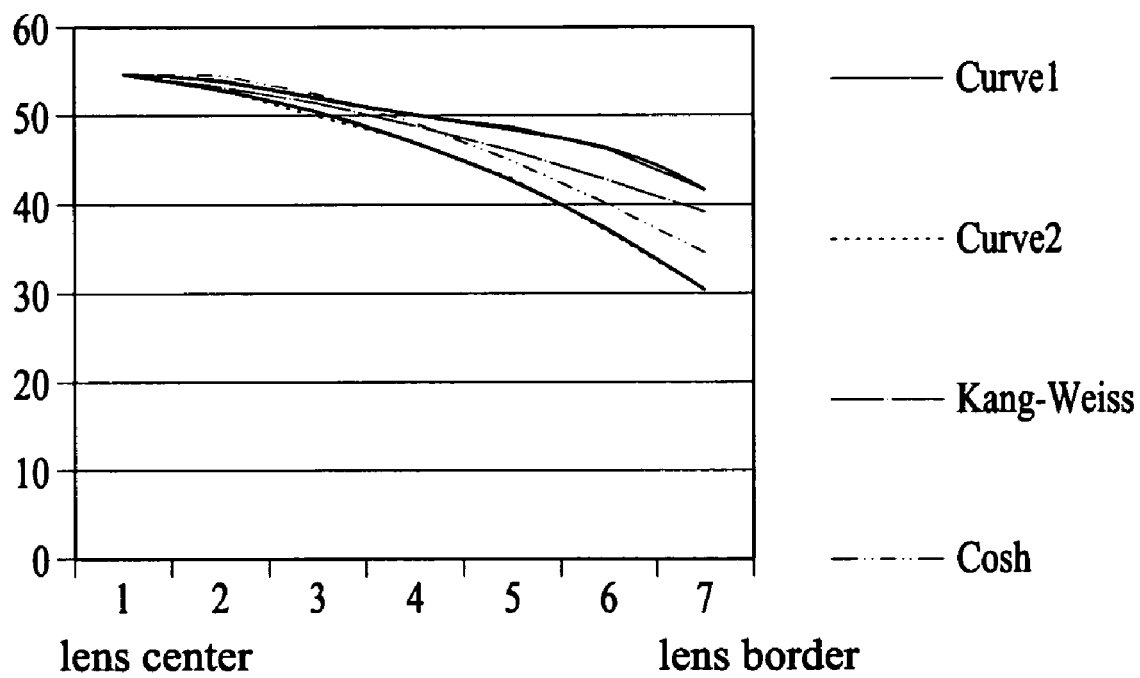
FIG. 1 shows four curves that describe a composite result of practical luminance variations.

FIG. 1 shows four curves that describe a composite result of practical luminance variations. The curve 1 describes the luminance variations from the lens center to left horizontal plane. The curve 2 describes the luminance variations from the lens center to the border at upper-left corner. Further, the curve Kang-Weiss and the dual-curved equation Cosh are used to perform an approximation, but fail to achieve complete matching. Otherwise, if a polynomial equation is preferred to perform the approximation, the curve described by the equation can even more approach the luminance variations along the directional line. The mentioned lookup table recording the luminance variations approximates the effect of the polynomial equation as it also approaches the variant curve in every single direction. Namely, the lookup table records the luminance variations of the plurality of sampling dots along each directional line. It is featured that, by means of multiline interpolation, the lookup table introduced to the method of luminance compensation is particularly established to implement the luminance compensation for the camera lens.

In particular, the method of luminance compensation using the multiline interpolation of the present invention is directly to sample the luminance values along the directions, which are arranged on the curved surface of the camera lens, spaced equally or at different distances. Along the different virtual directional lines on the surface of lens, the method can sample the luminance variations effectively within the same distance from the lense centre. Under the correction of luminance of the lens, an interpolation weight is designated based on the square of the distance between the pixel to be corrected and the lens center, or alternatively based on the sinusoidal variance of the vertical or horizontal axis through the lens center. Moreover, an interpolation value for luminance is calculated according to the luminance sampled along two adjacent directional lines at the same distance from the centre. After that, the claimed luminance interpolation algorithm is then performed for compensating the target, so as to restore a correction plane of the whole image.

Figure 2A:
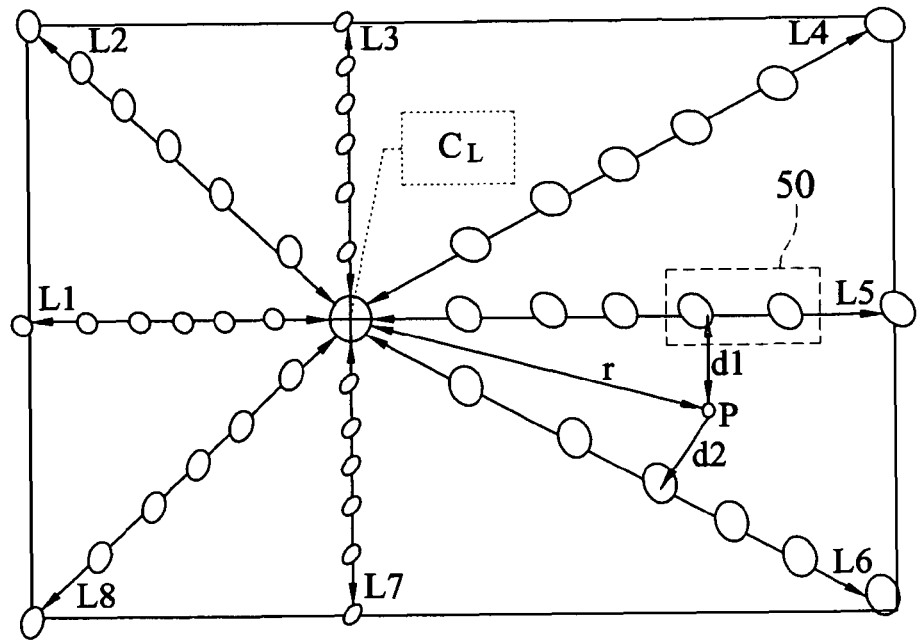
FIG. 2A shows a schematic diagram of the radial sampling and the scheme for restoring using interpolation of the present invention.
Figure 2B:
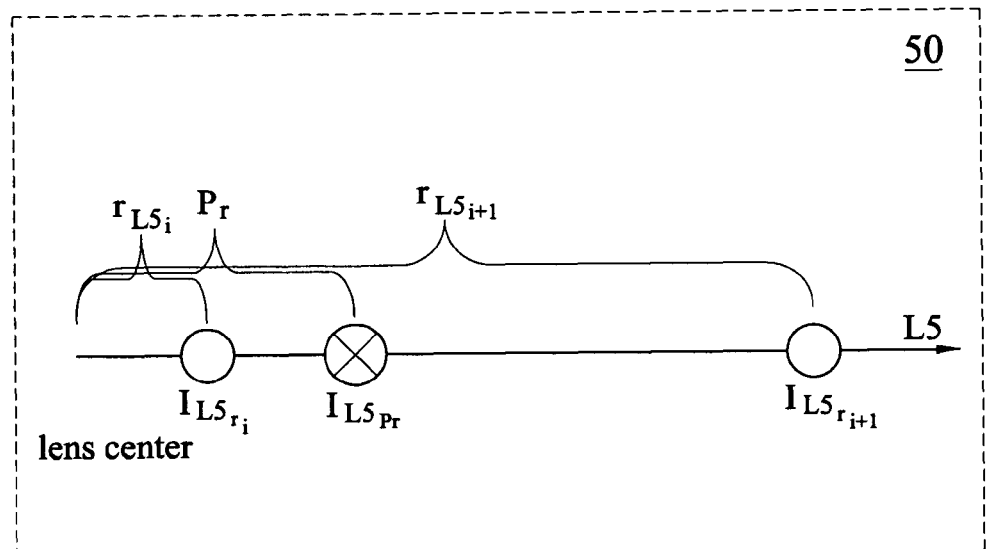
FIG. 2B shows a schematic diagram of performing the interpolation operation on the sampling dots along a directional line of the present invention.

References are made to FIG. 2A and FIG. 2B, in which the FIG. 2A shows a schematic diagram of the radial sampling and the scheme for restoring using interpolation of the present invention.

In the figure, the plurality of sampling dots designated on the curved surface of the lens are shown. In this example of regarding the lens center as an origin of the surface, there are eight directional lines radiating from the origin to the lens border. Those directional lines are separately marked as L1, L2, L3, L4, L5, L6, L7 and L8. It is to sample the same number of dots spaced at equal or different distances along each directional line, six sampling dots each line in this example. Since a merely one-dimensional lookup table is needed to describe the luminance variation in each direction, a lookup table with correction data for each dot is one of the ways to store luminance variation in a read-only or rewritable memory.

When the camera lens is under correction, the image plane can be divided into four quadrants in a coordinate system using the lens center as an origin. In this example, the line connected with the directional lines L1 and L5 and the other line connected with the directional lines L3 and L7 form the coordinate system, and the location of lens center $C_L$ is used to be the origin. Therefore, the quadrant where the target P for luminance compensation is located is known.

Moreover, by calculating the slope of a diagonal line in the quadrant where the target P is located, that is the slope of the line connected with the line L2 and L6 in this example, the two directional lines adjacent to the target P can be obtained. They are the directional lines L5 and L6 in this example.

The adjacent two directional lines can be obtained by substituting the coordinates for the target P into a slope equation of the diagonal line. If the slope resulted from the slope equation is a positive value, the target P is located at the left side of the diagonal line; if the slope is a negative value, the target P is located at the right side of the diagonal line. Next, the two adjacent directional lines, which are represented as $L_N$ and $L_{N+1}$, of the target P are respectively used to obtain the two correction values of the sampling dots on corresponding directional lines at the same distance $r_p$ by referring to the lookup table. The correction values of the sampling dots are:

$$I_{L_{Nr_i}}, I_{L_{Nr_{i+1}}},$$

wherein $r_i < r_p < r_{i+1}$, and $r_i$ and $r_{i+1}$ are respectively the distances of the sampling dots from the lense centre along the two adjacent directional lines.

$$I_{L_{N_{Pr}}}, I_{L_{N+1_{Pr}}}$$

After that, a correction value for the position with the same distance $r_p$ along one directional line can be next obtained from the two correction values of the sampling dots by performing an interpolation operation. Accordingly, the correction values for the same distances to the lense centre $r_p$ along two directional lines adjacent to the target P are then obtained:

$$I_{L_{N_{Pr}}}, I_{L_{N+1_{Pr}}}$$

Next, the weights with the corresponding correction values can be calculated based on the distances d1 and d2 from the target to the adjacent directional lines, or based on the sinusoidal variance d1/$r_p$ of a vertical distance $r_p$ between the target P and the lens center $C_L$. Then the luminance compensation value for the target P is obtained by performing an interpolation algorithm.

In one embodiment, the number of the arranged directional lines and the number of the sampling dots are determined by taking into consideration of quality of lens. The numbers of the directional lines and the sampling dots are two factors to control the quality of correction and the cost of memory. In the exemplary example, if the directional lines L2, L4, L6 and L8 are the lines for sampling and interpolation, around half of capacity of memory can be reduced. The number for sampling can be adjusted according to the memory capacity.

FIG. 2B shows a schematic diagram for using the interpolation on the sampling dots along a direction. It also shows the relationship of the dots in the area 50 of FIG. 2A.

The location with the same distance from the lense centre of the target P for luminance compensation along the directional line L5 is $$I_{L_{5_{Pr}}}.$$

The distance between the target P and the lens center is Pr. The interpolation operation of the sampling dots is performed on the directional line L5 relevant to the target P. The sampling dots are respectively marked as $$I_{L_{5_{r_i}}} \text{ and } I_{L_{5_{r_{i+1}}}},$$

and the distances to the lens center are $r_{L_{5i}}$ and $r_{L_{5i+1}}$.

$$I_{L_{5_{Pr}}}, I_{L_{6_{Pr}}}$$

After calculating the slope, as shown in FIG. 2A, the luminance correction values are firstly calculated along the directional lines L5 and L6 adjacent to the target P. The values are:

$$I_{L5_{Pr}}, I_{L6_{Pr}}$$

The correction value $$I_{L5_{Pr}},$$

in an example, is obtained by referring to the sampling dots $$I_{L5_{r_i}} \text{ and } I_{L5_{r_{i+1}}}$$

along the relevant directional line. Next, the distances d1 and d2 shown in FIG. 2A, or alternatively the sinusoidal variances d1/$r_p$ and W−d1/$r_p$ are calculated to be an interpolation weight of the compensation value for the target P. Thus, the correction values $$I_{L5_{Pr}} \text{ and } I_{L6_{Pr}}$$

with corresponding directional lines and the interpolation weight are obtained. Thereby the luminance compensation for the target P is calculated by performing the interpolation algorithm, so as to restore the correction plane of the whole image.

Following statement depicts a scheme to describe the luminance variation with a polynomial equation. Or a preferred embodiment of a lookup table is used to create a curve of luminance variation. The correction value is then obtained.

One embodiment illustrates a scheme of creating the curve of luminance variation by a lookup table.

The sampling dots arranged along the directional line shown in FIG. 2A are recorded in a lookup table. The usage of memory is different from the other scheme. It is easy and efficient that the lookup table is used to describe the luminance variation along the directional line. Only the interpolation operation is required to obtain the correction values along the line while correction.

According to the preferred embodiment, reference is made to FIG. 2A, the calculation of interpolation weights employs a distance equation operated between a point and a line. The interpolation by the lookup table uses the square of the distance to the lense centre of each sampling dot to substitute a conventional way of estimating luminance using the square root of the distance to the lense centre. Therefore, the use of a hardware circuit for performing the square root operation can be reduced. The equation for obtaining the compensation value for the target is formulated as:

$$P = (d2 \times I_{L_{N_{Pr}}} + d1 \times I_{L_{N+1_{Pr}}})/(d1 + d2)$$

wherein $$I_{L_{N_{Pr}}} = \frac{Pr - r_{L_{N_i}}}{r_{L_{N_{i+1}}} - r_{L_{N_i}}} \times (I_{L_{N_{r_{i+1}}}} - I_{L_{N_{r_i}}}) + I_{L_{N_{r_i}}};$$

i indexes the sampling dots, such as 1, 2, etc.
N indexes the directional lines, such as 1, 2, etc.

$$Pr = (Px - C_L x)^2 + (Py - C_L y)^2$$

$$r_{L_{N_i}} = (x_{L_{N_i}} - C_L x)^2 + (y_{L_{N_i}} - C_L y)^2;$$

$$d1, d2 = \frac{(Px \cdot Slope_N - Py) \cdot (Px \cdot Slope_N - Py)}{Slope_N \cdot Slope_N + 1}$$

Pr is a distance between the target P to the lens center. Px and Py are the coordinates for the target P. $C_L x$ and $C_L y$ are the coordinates describing the lens center.

$$r_{L_{N_i}}$$

represents the distance from each sampling dot along the adjacent directional lines to the lens center. $Slope_N$ is the slope ($Slope_2 = C_L y/C_L x$) of a specific directional line $L_N$. Therefore the capacity of memory used for describing the curve of luminance variation by the lookup table is (N lines multiplying M sampling dots each line plus 2 coordinates for lens center) multiplying 3 values of RGB.

Another embodiment regards the sinusoidal variance as a way to decide the interpolation weight.

In an example, the target P described as P(x,y) for luminance compensation is located in one quadrant of the coordinate. If a diagonal line for sampling directs along a direction with a 45-degree oblique angle, the division made by the diagonal line is used to calculate the variation of sinusoidal square.

Figure 3:
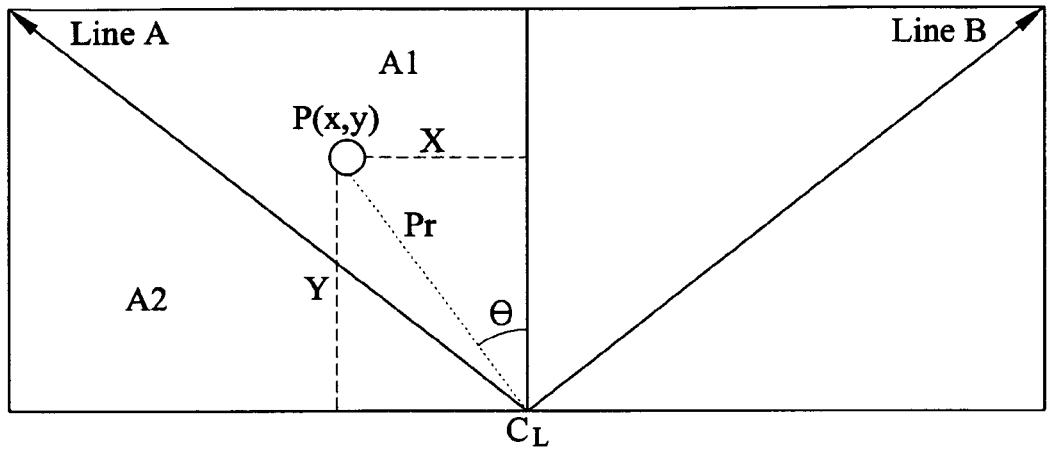
FIG. 3 shows a schematic diagram of regarding a sinusoidal variance as the interpolation weight.

In an exemplary example, reference is made to FIG. 3, which shows a schematic diagram of regarding the sinusoidal variance as the interpolation weight of the preferred embodiment. Area A including sub-regions A1 and A2 is instanced. If the target P with coordinates P(x,y) for luminance compensation is located at the sub-region A1, the value of target P can be obtained from the sampling dots along the Line A and Line B by performing an interpolation operation. The vertical distance between the location P(x,y) and the lens center $C_L$ is X, and Y is the horizontal distance from the location P(x,y) through the lens center $C_L$. Pr is a radius from target P to the lense centre $C_L$. An included angle θ is between the line segment from target P to the lens center $C_L$ and the vertical line through the lens center $C_L$.

The variables in the sub-region A1 have the following relationship:

Because θ is between 45 degree and 0 degree (45°<θ<0°), $\sin θ^2$ is between 0 and 0.5 (0<$\sin θ^2$<0.5), or becomes 0<0.5+$\sin θ^2$<1, or can be 0<0.5+(X/Pr)$^2$<1.

Since the value 0.5+(X/Pr)$^2$ is between 0 and 1, this value can be an interpolation weight for two line segments. Firstly the value $$I_{L_{A_{Pr}}}$$

of the Line A with an equal radius and the value $$I_{L_{B_{Pr}}}$$

of the Line B with the equal radius need to be obtained. The interpolation value for the target P is:

$$P = I_{L_{A_{Pr}}} \times \left(0.5 + \frac{X^2}{Pr^2}\right) + I_{L_{B_{Pr}}} \times \left(0.5 - \frac{X^2}{Pr^2}\right)$$

Furthermore, if the target is located at the sub-region A2, the distance Y decides the sinusoidal variance. This sinusoidal variance is substituted into the equation:

$$P = I_{L_{A_{Pr}}} \times \left(0.5 + \frac{Y^2}{Pr^2}\right) + I_{L_{B_{Pr}}} \times \left(0.5 - \frac{Y^2}{Pr^2}\right)$$

Based on the above-description, the scheme using the sinusoidal variance to be the interpolation weight can simplify the conventional operation on the weights using the distances d1 and d2. The prior complicated calculation of the distance between a point and a line is substituted and the relevant divider can be reduced.

The method of luminance compensation for a camera lens by performing a multiline interpolation of the present invention is preferably adapted to compensate the luminance on the surface of the lens. One of the objects of the present invention is to restore an image' plane by performing the interpolation operation on the sampling dots designated along the directional lines radiating from a lens center of the surface. One of the preferred embodiments is referred to FIG. 4.

Before the step of calculating the compensation value for the target, a plurality of directional lines are firstly arranged on the lens surface. A plurality of sampling dots are then designated along each directional line. A lookup table recording the sampling dots and the luminance references is subsequently established.

Figure 4:
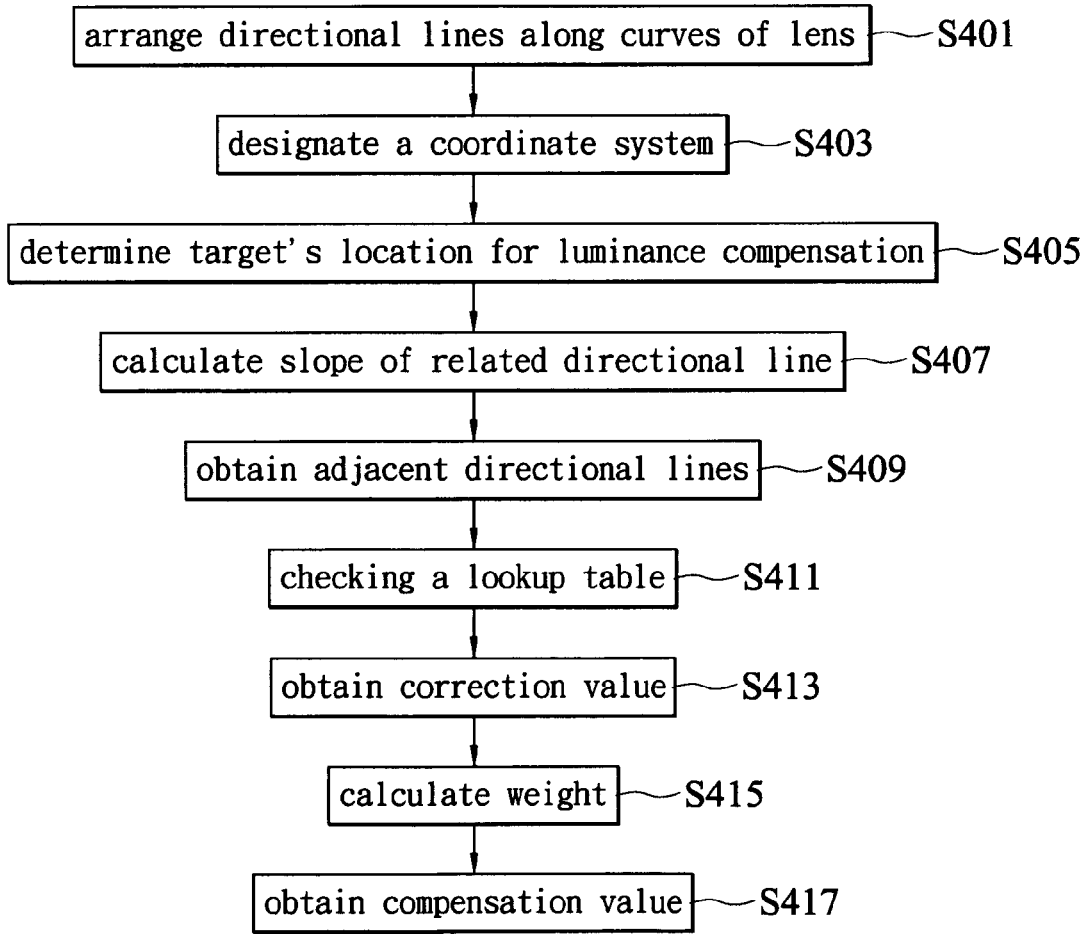
FIG. 4 is a flow chart of the method of luminance compensation for a camera lens using the multiline interpolation of the embodiment of the present invention.

According to the preferred embodiment shown in FIG. 4 of the present invention, the plurality of directional lines radiating from a lens center to the border are arranged in step S401. While a target for luminance compensation is designated, a suitable coordinate adapted to the curved surface of the lens is determined. The coordinate axes are defined (step S403). Next, the target's location is determined (step S405). The location includes the quadrant the target is located in. Since the target is located in a specific quadrant, the slope for each directional line relevant to the quadrant can be calculated (step S407). The directional lines adjacent to the target can be determined based on its coordinates. The related scheme can refer to the description of FIG. 2A. In which the slope with plus or minus value can be determined by substituting the coordinates into a slope equation of a diagonal line (step S409).

In next step S411, the luminance variation along each directional line can be obtained by referring to the lookup table. Thereby two (or more) correction values with corresponding directional lines at the same distance from the lense centre can be obtained by performing the interpolation on the same distance from the target (step S413). In a practical embodiment undergoing the lens correction, two or more weights with the corresponding correction values are then calculated in response to the distance from the target to the two adjacent directional lines, or the sinusoidal variance of the vertical distance from the target to the lens center (step S415).

Next, the luminance interpolation values of the two adjacent directional lines are obtained by referring to the lookup table. Consequently, the compensation value for the target is obtained by performing the multiline interpolation algorithm (step S417). So that the correction plane of the whole image is restored.

Figure 5:
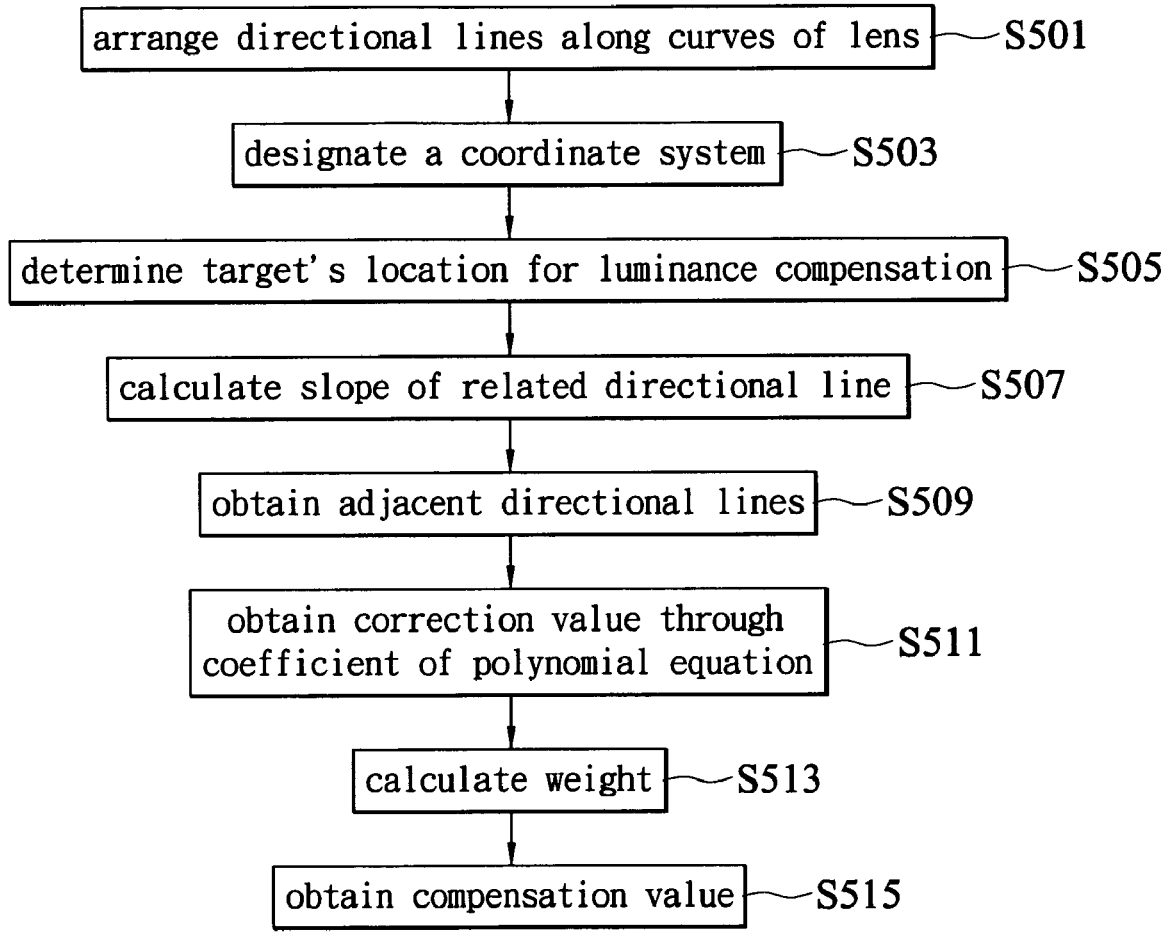
FIG. 5 is another flow chart of the method of the embodiment of the present invention.

FIG. 5 shows another flow chart of the embodiment of the present invention.

In the beginning of the steps, a plurality of directional lines radiating from the center to the border of the lens are arranged on the lens surface (step S501). A coordinate adapted to the lens surface is designated (step S503). Next, the location of the target for luminance compensation is determined, and preferably the quadrant where the target is located in (step S505). The slopes of the directional lines related to the quadrant are calculated (step S507). The directional lines adjacent to the target are determined accordingly (step S509).

After that, the luminance variations at the positions with the same distance from the target along the directional line can be obtained, especially by calculating a coefficient of a polynomial equation. The correction values along the two adjacent directional lines are then obtained (step S511). In practical, the weights are calculated based on the distances from the target to the adjacent directional lines, or the sinusoidal variance of the vertical distance from the target to the lens center (step S513). The compensation value for the target is finally calculated based on the weights by performing the interpolation operation (step S515). The correction plane of the whole image is restored.

The multiline interpolation of the present invention is not suitable for the high-quality symmetric lens, but preferably for the asymmetric lens having abnormal changes on a partial area. Especially for the low-cost or low-quality lens, the claimed interpolation provides a simple and easy-to-design approach which can efficiently reduce costs.

To sum up, the method of luminance compensation for the camera lens using the multiline interpolation of the present invention uses the plurality of radial directional lines designed on the lens surface, and on which designates the sampling dots spaced in equal or variant distance. Through the determination location of the target, and calculation of slopes of the adjacent directional lines, the correction values and interpolation weights can be obtained. It is featured to perform a regional compensation and restore the correction plane of the whole image.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A method of luminance compensation for a camera lens by performing a multiline interpolation algorithm, used for compensating luminance of an image projected on a lens' curved surface, on which a plurality of directional lines radiating from a center of lens and a plurality of sampling dots are designated, comprising:

designating a target for luminance compensation;

determining the target's location;

determining two or more directional lines adjacent to the target;

obtaining two or more correction values with corresponding directional lines in a distance with the same radius;
calculating two or more weights with the corresponding correction values; and
obtaining a compensation value for the target by performing the multiline interpolation algorithm.

2. The method of claim 1, wherein a plurality of slopes of the directional lines relevant to the target are calculated, and the target's coordinates are substituted into a slope equation of one of the directional lines, in order to determine the target's adjacent directional lines.

3. The method of claim 1, wherein the weight is calculated by referring to a sinusoidal variance of a vertical distance between the target and the center of the lens.

4. The method of claim 1, wherein the correction values with corresponding directional lines at the same distance from the lense centre are obtained by referring to the polynomial equations of the directional lines, and the distances between the target and the adjacent directional lines are used to set the weight, in order to calculate the compensation value.

5. The method of claim 1, wherein a lookup table is introduced to obtain the correction values, and the distances between the target and the adjacent directional lines are used to set the weight, in order to calculate the compensation value.

6. The method of claim 5, wherein the compensation value for target P is formulated as:

$$P = \left(d2 \times I_{L_{N_{Pr}}} + d1 \times I_{L_{N+1_{Pr}}}\right) / (d1 + d2)$$

wherein, $$I_{L_{N_{Pr}}} \text{ and } I_{L_{N+1_{Pr}}}$$

represent the correction values, d1 and d2 respectively represent the vertical distances between the target and adjacent directional lines, and $$I_{L_{N_{Pr}}} = \frac{Pr - r_{L_{N_i}}}{r_{L_{N_{i+1}}} - r_{L_{N_i}}} \times \left(I_{L_{N_{r_{i+1}}}} - I_{L_{N_{r_i}}}\right) + I_{L_{N_{r_i}}};$$

wherein i represents the index of the sampling dots, including 1, 2, etc.; N represents the reference number of the directional line, including 1, 2, etc.;

$$Pr = (Px - C_L x)^2 + (Py - C_L y)^2;$$

$$r_{L_{N_i}} = (x_{L_{N_i}} - C_L x)^2 + (y_{L_{N_i}} - C_L y)^2;$$

$$d1, d2 = \frac{(Px \cdot Slope_N - Py) \cdot (Px \cdot Slope_N - Py)}{Slope_N \cdot Slope_N + 1}$$

wherein Pr represents the vertical distance between the target and the center of the lens, Px and Py represent the coordinates of the target, $C_L x$ and $C_L y$ represent the coordinates of the center of the lens, $$r_{L_{N_i}}$$

represents the distance between the sampling dots and the center of the lens, $$x_{L_{N_i}}$$

represents a horizontal coordinate of the sampling dot, $$y_{L_{N_i}}$$

represents a vertical coordinate of the sampling dot, $Slope_N$ represents the slope of the directional line $L_N$.

7. A method of luminance compensation for a camera lens using a multiline interpolation algorithm, comprising:
performing the multiline interpolation algorithm, used for compensating luminance of an image projected on the camera lens curved surface;
setting a plurality of directional lines on the lens curved surface and a plurality of sampling dots along the directional lines;
designating a target for luminance compensation;
determining the target's location;
calculating slopes with corresponding directional lines relevant to the location of the target;
determining two or more directional lines adjacent to the target based on the calculated slopes;
obtaining two or more correction values with corresponding directional lines in at the same distance from the lens center by referring to a lookup table;
calculating two or more weights with the corresponding correction values; and
obtaining a compensation value for the target by performing the multiline interpolation algorithm.

8. The method of claim 7, wherein the lookup table presenting the changes between the sampling dots and the luminance is generated by introducing the directional lines arranged on the lens' curved surface and the sampling dots thereon.

9. The method of claim 7, wherein when the target's location is determined, a coordinate system is then decided and a quadrant for locating the target is determined.

10. The method of claim 7, wherein the method for determining the directional lines adjacent to the target is based on their slopes, comprising:
substituting the coordinates of the target for luminance compensation into a slope equation, whereby, if the result is larger than zero, the target is located at the left side of the directional line;
if the result in smaller than zero, the target is located at the right side of the directional line.

11. The method of claim 7, wherein the weight is set based on a distance between the target for luminance compensation and the adjacent directional lines.

12. The method of claim 7, wherein the weight is calculated based on a sinusoidal variance of a vertical distance between the target and a center of the lens.

13. The method of claim 7, wherein the compensation value for target P is formulated as:

$$P = I_{L_{N_{Pr}}} \times \left(W + \frac{X^2}{Pr^2}\right) + I_{L_{N+1_{Pr}}} \times \left(W - \frac{X^2}{Pr^2}\right) \text{ or}$$

-continued $$P = I_{L_{N_{Pr}}} \times \left(W + \frac{Y^2}{Pr^2}\right) + I_{L_{N+1_{Pr}}} \times \left(W - \frac{Y^2}{Pr^2}\right)$$

wherein $$I_{L_{N_{Pr}}} \text{ and } I_{L_{N+1_{Pr}}}$$

represent the correction values for the two directional lines, W is the sine of an included angel between a vertical axis through the center of the lens along one directional line and a horizontal axis, X and Y respectively represent a horizontal distance and a vertical distance through target P to the center of the lens, and $$I_{L_{N_{Pr}}} = \frac{Pr - r_{L_{N_i}}}{r_{L_{N_{i+1}}} - r_{L_{N_i}}} \times \left(I_{L_{N_{r_{i+1}}}} - I_{L_{N_{r_i}}}\right) + I_{L_{N_{r_i}}}$$

wherein i represents the indices of the sampling dots, such as 1, 2, etc., N represents the indices of the directional lines, such as 1, 2, etc.;

$$Pr = (Px - C_L x)^2 + (Py - C_L y)^2;$$

$$r_{L_{N_i}} = (x_{L_{N_i}} - C_L x)^2 + (y_{L_{N_i}} - C_L y)^2;$$

wherein Pr represents the distance between the target and the center of the lens, Px and Py represent the coordinates of the target, $C_L x$ and $C_L y$ represent the coordinates of the center of the lens, $$r_{L_{N_i}}$$

represents the distance between the sampling dot along the adjacent directional line and the center of the lens, $$x_{L_{N_i}}$$

represents a horizontal coordinate of the sampling dot, and $$y_{L_{N_i}}$$

a vertical coordinate of the sampling dot.

* * * * *